No. 731,581. PATENTED JUNE 23, 1903.
H. LEITNER & R. N. LUCAS.
DYNAMO ELECTRIC MACHINERY.
APPLICATION FILED JULY 21, 1902.
NO MODEL.
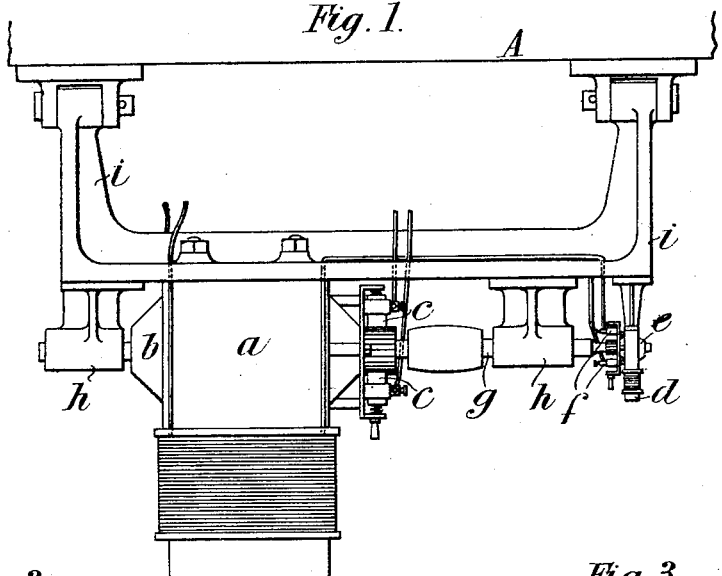
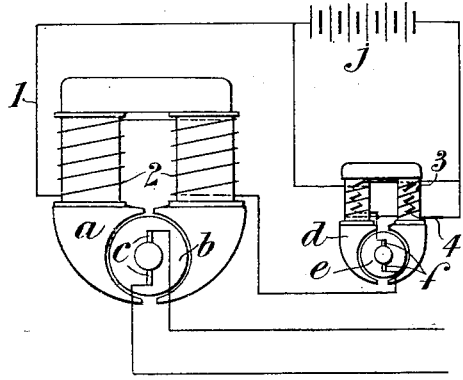
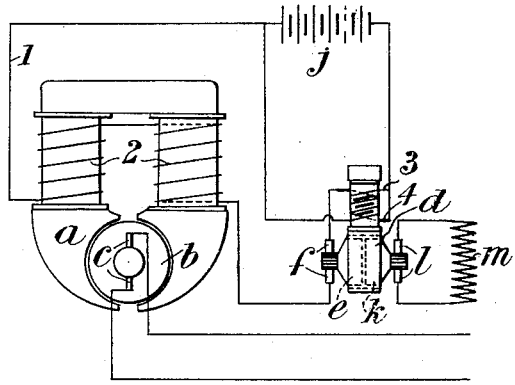
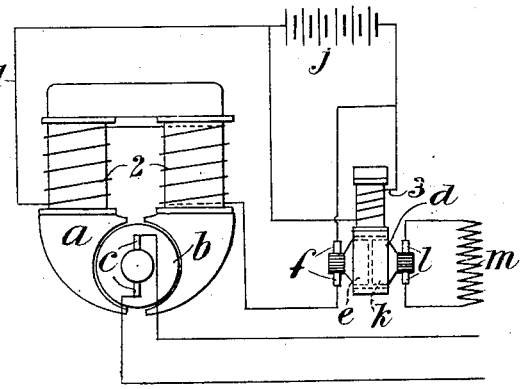
Witnesses:
J. K. Moore
F. H. Hubbard
Inventors
H. Leitner
R. N. Lucas
By their attys.
Whitaker Prevost No. 731,581.  Patented June 23, 1903.

UNITED STATES PATENT OFFICE.

HENRY LEITNER, OF WOKING, AND RICHARD NORMAN LUCAS, OF LONDON, ENGLAND.

DYNAMO-ELECTRIC MACHINERY.

SPECIFICATION forming part of Letters Patent No. 731,581, dated June 23, 1903.

Application filed July 21, 1902. Serial No. 116,395. (No model.)

*To all whom it may concern:*

Be it known that we, HENRY LEITNER, of The Accumulator Industries, Limited, Woking, Surrey, and RICHARD NORMAN LUCAS, residing at 44 St. Martin's Lane, London, England, both subjects of the King of Great Britain, have invented new and useful Improvements in Dynamo-Electric Machinery, of which the following is a specification.

This invention relates to improvements in dynamo-electric machinery of the kind wherein the voltage at the terminals is kept constant by the employment of a secondary dynamo, which generates a counter-excitation current through the field of the main dynamo or a counter electromotive force as the speed of the main dynamo increases. Now in such machinery as heretofore made there is a possibility of the secondary dynamo developing at high speeds so high a voltage as to endanger its burning out, a danger which exists when a simple shunt-wound or separately-excited machine is employed to weaken the field of another dynamo, as above described. According to the present invention this danger is obviated by the employment of an additional series winding in the field of the secondary dynamo and which operates as hereinafter described. Furthermore, in such arrangements, where the secondary or demagnetizing dynamo does not supply any actual current, but merely produces an opposing electromotive force, the characteristic of the dynamo is nearly a straight line, owing to the absence of armature reaction. In practice it is necessary that the characteristic of the demagnetizing-dynamo should be more or less drooping curve, and to effect this according to this invention we make use of a double armature, from which current can be taken through a resistance adapted to be adjusted as required, thereby introducing armature reaction and causing the characteristic to assume the required form.

In the accompanying drawings, Figure 1 represents a bipolar dynamo for use in train-lighting and having our improvements applied thereto. Fig. 2 is a diagrammatic view illustrating the arrangement wherein the additional series winding is employed in the field of the secondary dynamo; and Figs. 3 and 4 are diagrammatic views illustrating, respectively, the adaptation of the double armature to an arrangement of the kind shown in Fig. 2 and to an arrangement which does not possess the additional series winding in the field of the secondary dynamo.

$a$ represents the magnet of the main dynamo, $b$ the armature, and $c\ c$ the collecting-brushes thereof.

$d$ represents the magnet of the secondary or auxiliary motor, $e$ the armature, and $f f$ the collecting-brushes thereof.

As will be seen from Fig. 1, both armatures $b$ and $e$ are upon the same shaft $g$, which is mounted in bearings $h\ h$ upon the under side of the frame $i$, bolted to the underframing of the railway-carriage A.

$j$ is an accumulator-battery, which is charged by the dynamo and which supplies the excitation-current for the field of the said dynamo. The current from the battery flows from the positive pole through the wire 1 and the field-winding 2 in series connection with the armature of the secondary dynamo, the fine-wire field-winding 3 of which is so connected to the two poles of the battery of accumulators $j$ that the generated electromotive force of the said secondary dynamo tends to send a current through the field of the main dynamo in a direction contrary to that in which the excitation-current of the said field flows—that is to say, sets up a counter-potential, which diminishes the current flowing through the main excitation-coil.

To prevent the possibility of the winding of the secondary dynamo being burned out when the speed increases largely after the main dynamo has been cut out, we make use of the subsidiary coil 4 to the second dynamo, this coil 4 being in the field of the secondary dynamo and being in series with the winding 2 of the main dynamo. With this arrangement at normal speeds the current flowing through the series winding 4 is the same current that energizes the field of the main dynamo, and it assists the magnetism of the field of the secondary or demagnetizing dynamo. Should, however, by reason of high speed, the current in the field of the main dynamo be reversed, due to its being overpowered by the voltage of the secondary dynamo, then the current in the series winding 4 is also reversed, thus weakening the field, reducing the voltage of the secondary dynamo, and so preventing burning out.

In some cases, as above described, we make use of additional means for maintaining the constancy of the voltage at the extreme limit of speed, such means consisting in providing the secondary dynamo with two armatures so arranged that as the speed increases armature-reaction is generated, which thus weakens the field of the secondary dynamo—that is to say, prevents the voltage of the secondary dynamo increasing proportionately with the increase of speed. Two such arrangements are shown in Figs. 3 and 4, respectively. In these figures, $k$ represents the additional armature, the brushes $l\,l$ of which collect the current and cause it to pass through the resistance $m$, thereby introducing armature reaction in the secondary dynamo. The result of this armature reaction is that the characteristic curve of the said dynamo is altered in form from a practically straight line to a more or less drooping curve. As above described, the resistance $m$ can be adjusted to suit requirements.

Although we have described our invention as applied to the lighting of trains, it will be obvious, as above mentioned, that it can also find other uses—for example, the improvements can be advantageously applied to dynamos driven by wind or water power and in other cases where dynamos are liable to fluctuations of speed and where it is desired to maintain the voltage constant.

It will be understood that shunt or series positive or negative windings can be added to the generator or to the demagnetizer for regulating or otherwise modifying the characteristics of the apparatus.

Having now particularly described and ascertained the nature of our said invention and in what manner the same is to be performed, we declare that what we claim is—

1. An electric system for lighting and other purposes of the kind wherein a secondary dynamo is employed to weaken the field of a main generator as the speed of the said generator increases, characterized by a series winding in the field of the demagnetizing or secondary dynamo so arranged in the circuits that the current through it at normal speeds assists in the magnetization of its field and when the voltage of the demagnetizing-dynamo, owing to rise of speed, exceeds a certain amount, the current in the series winding of its field reverses and weakens the said field of the demagnetizer.

2. An electric system for lighting and other purposes of the kind wherein a secondary dynamo is employed to weaken the field of a main generator as the speed of the said generator increases, characterized by a secondary dynamo having two armatures, one of which is employed to weaken the field of the main generator, while the other is closed through a suitable resistance so as to introduce armature reaction and vary the characteristic of the demagnetizing-dynamo.

HENRY LEITNER.
RICHARD NORMAN LUCAS.

Witnesses:
C. G. REDFERN,
A. ALBUTT.